United States Patent [19]
Seibold

[11] 3,708,004
[45] Jan. 2, 1973

[54] GOLF CLUB CARRIER

[76] Inventor: Paul F. Seibold, 26665 York Road, Huntington Woods, Mich. 48070

[22] Filed: Aug. 31, 1970

[21] Appl. No.: 68,073

[52] U.S. Cl. .........150/1.5 B, 280/47.26, 280/DIG. 6
[51] Int. Cl. ..............................................A63b 55/08
[58] Field of Search..280/47.17, 47.19, 47.26, 47.37, 280/DIG. 6; 150/1.5 R, 1.5 B, 1.5 C; 190/18 A

[56] References Cited

UNITED STATES PATENTS

| | | | |
|---|---|---|---|
| 3,550,999 | 12/1970 | Bogan | 280/47.19 |
| 2,475,454 | 7/1949 | Merrill | 280/47.26 X |
| 2,783,054 | 2/1957 | Stratton | 280/DIG. 6 |
| 3,425,708 | 2/1969 | Sato | 280/DIG. 6 |
| 2,955,834 | 10/1960 | Jaskey | 280/DIG. 6 |
| 3,142,087 | 7/1964 | Yokers | 280/47.17 X |
| 1,826,216 | 10/1931 | Johnson | 150/1.5 B |

FOREIGN PATENTS OR APPLICATIONS

| 439,932 | 1/1927 | Germany | 150/1.5 B |
|---|---|---|---|

*Primary Examiner*—Benjamin Hersh
*Assistant Examiner*—Leslie J. Paperner
*Attorney*—Harness, Dickey & Pierce

[57] ABSTRACT

A very light compact golf club carrier is provided with a bag portion of rigid construction preferably of molded plastic. The rigid bag portion supports a pair of wheels at the bottom center or at the forward edge when a foot at the rearward edge is provided to form a three-point support. A bail is pivoted at the top of the bag portion which is movable downwardly thereagainst to form a compact unit. The bag portion, bail, wheels and axle are boxed as a kit and require no assembly by the manufacturer.

3 Claims, 9 Drawing Figures

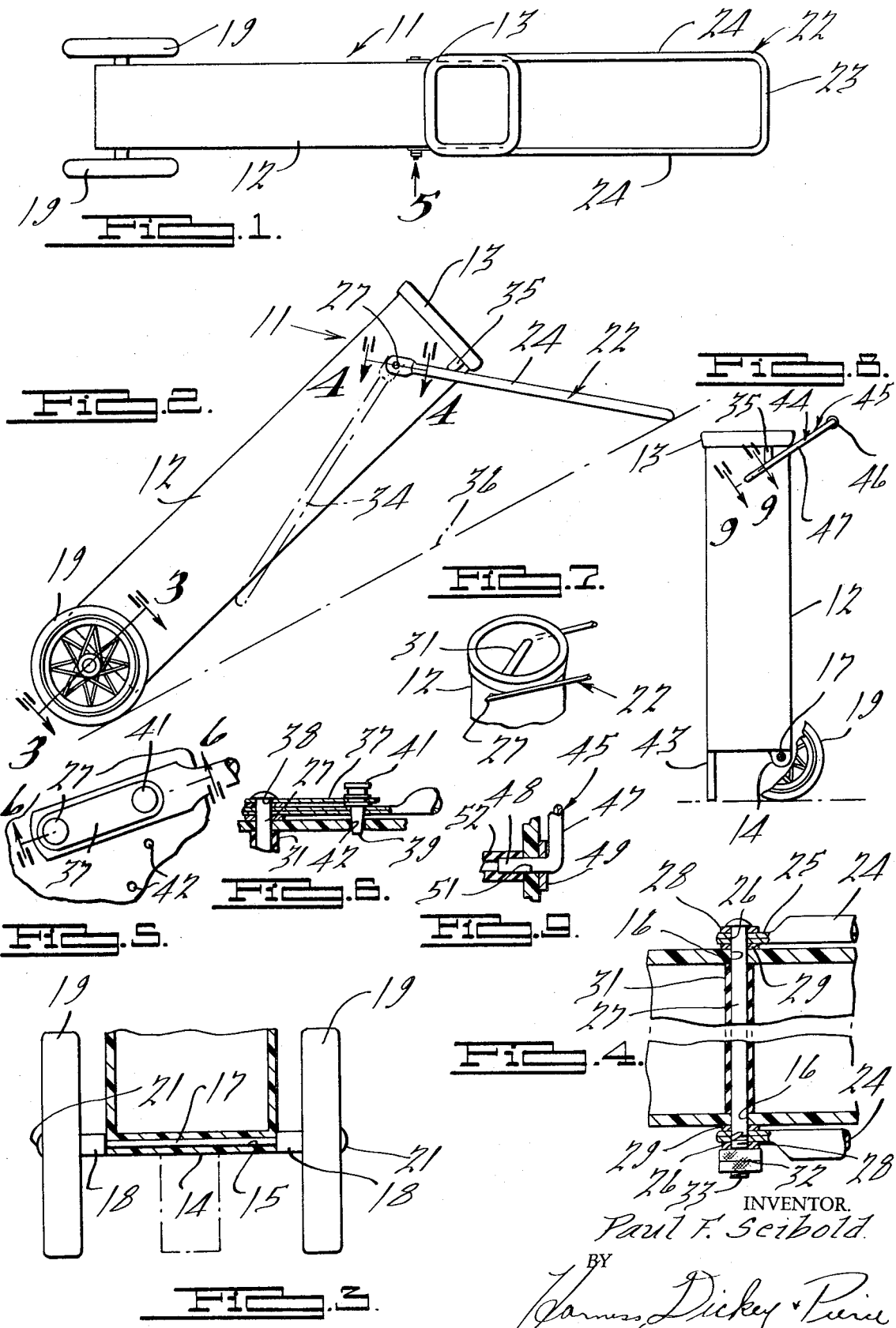

GOLF CLUB CARRIER

BACKGROUND OF THE INVENTION

A search of the art disclosed the following pertinent U.S. Pats over which the present golf club carrier is believed to be patentable: Nos. 2,326,482; 2,629,609; 2,783,054 and 3,425,708.

CROSS REFERENCE TO RELATED APPLICATIONS

Reference may be had to applicant's copending applications, Ser. No. 813,568, filed Apr. 4, 1969 for "GOLF BAG", now U.S. Pat. No. 3,559,709, and Ser. No. 68,074, filed Aug. 31, 1970 for "GOLF CLUB CARRIER."

SUMMARY OF THE INVENTION

The invention pertains to a golf club carrier having a bag portion used as a support for a pair of wheels at the bottom and a bail at the top forming a one-piece unit that is of light weight, durable, attractive and inexpensive. The bag portion is molded from a strong, light plastic material such as venol plastisol, polypropylene, acrylonitrile-butadiene-styrene (ABS) and the like. A boss across the bottom molded with the bag portion has a through aperture for a rod which forms the axle for a pair of wheels. A pair of sleeves is slid over the axle ends along with a pair of wheels which are spaced from the ends of the boss. Locking caps are forced over the ends of the rod to retain the wheels thereon.

The bail is made from a lightweight tube or rod which is bent into U-shape having a hand-gripping web and a pair of legs the ends of which are bent inwardly or flattened and provided with an aperture. A bolt is passed through the apertures in the bail and bag portion and through a tube within the bag portion or the inward ends are passed through apertures in the bag portion and secured in the ends of a tube therewithin. The top of the bag portion has a thickened collar portion to provide a neat appearance and strength at the top edge. The collar could act as a stop for the bail when in carrying position or a pair of lugs could be molded below the collar with which the legs of the bail engage when in carrying position. The bail is free to be swung downwardly against the lower portion of the bag portion to a carrying position. The tube forms a divider within the bag portion for separating the clubs into two groups. A bag with a tie cord could be used to cover the club heads when tied beneath the collar and a bag which clamps over the collar could be used to carry balls, tees and the like. The bail is of advantage in having the horizontal web used as a handgrip to prevent the carrier from tipping sidewardly on the two wheels which are spaced a minimum distance apart. The bag is extremely light and will require very little effort to pull or will stand in upright position. When the wheels are mounted across the center of the bottom, the carrier will stand at an angle on the wheels and web of the bail. When the wheels are located at the front edge of the bottom and a foot extends downwardly from the rear edge, a three-point support is provided for retaining the carrier in vertical position.

BRIEF DESCRIPTION OF THE DRAWINGS

FIG. 1 is a plan view of a golf club carrier embodying features of the present invention;

FIG. 2 is a view in elevation of the structure illustrated in FIG. 1;

FIG. 3 is an enlarged sectional view of the structure illustrated in FIG. 2, taken on the line 3—3 thereof;

FIG. 4 is an enlarged broken sectional view of the structure illustrated in FIG. 2, taken on the line 4—4 thereof;

FIG. 5 is an enlarged broken view of the structure illustrated in FIG. 1, as viewed from the point 5 thereof;

FIG. 6 is a sectional view of the structure illustrated in FIG. 5, taken on the line 6—6 thereof;

FIG. 7 is a perspective view of the top end of a bag, similar to that illustrated in the foregoing figure, with the bag in cylindrical form, FIG. 8 is a view of a carrier similar to that illustrated in FIG. 2, showing another form thereof; and FIG. 9 is a sectional view of the structure illustrated in FIG. 8, taken on the line 9—9 thereof.

DESCRIPTION OF THE PREFERRED EMBODIMENTS

A golf club carrier 11 has a bag portion 12 herein illustrated as being molded from a plastic material to have thin durable side walls with a thicker collar portion 13 at the top and a boss 14 adjacent to or on the bottom having an aperture 15 extending therethrough. A pair of apertures 16 extend through the wall of the bag near the top center thereof. A rod 17 is inserted through the aperture 15 in the boss 14 with the ends extending equidistance from the sides of the bag portion. A sleeve 18 is slid over each end of the rod 17 followed by a wheel 19 which are retained on the rod by a locking cap 21 forced over each end thereof.

A bail 22 is made from a light thin-walled tube having a web 23 and two legs 24 extending therefrom in parallel relation. The ends of the legs 24 are flattened at 25 and provided with an aperture 26 which is clearly illustrated in FIG. 4. A bolt 27 is illustrated as passing through a washer 28, the aperture 26 in one of the legs 24, through a washer 29 and an aperture 16 in the wall of the bag portion and through a tube 31 of a length to fit between the inner surfaces of the side walls. The bolt extends through another washer 29 and aperture 26 in the other leg 24 through another washer 28. Thereafter, a pair of thumb nuts 32 are screwed upon the threaded end 33 of the bolt. Sufficient friction can be provided to the legs 24 to require a light force to move the bail from carrying to storage position, the former being shown in solid line, the latter in the dotted line position 34 of FIG. 2.

A boss 35, in the nature of stop means, is preferably molded beneath the collar 13 at each side of the bag against which the bail 22 moves when in pulling position, as illustrated in the Figures. A ground line 36 is illustrated in FIG. 2 to show the angular position of the bag portion when supported by the bail when a club is to be used for striking a ball. In this position, the wheels do not tend to run away with the bag portion as it tends to do in a more vertical position.

While the bag portion in FIGS. 1 to 4 is illustrated as being square in shape with rounded corners, it is to be understood that the bag can be circular in shape as illustrated in FIG. 7. A circular bag will follow the same construction as the rectangular bag which was described in detail hereinabove.

In FIGS. 5 and 6, a lock is illustrated which may be provided for locking the bail in different positions on the bag. The lock embodies a spring strip 37 having an aperture 38 through which the bolt 27 extends and having on the end a stud 39 secured in position by a thumb nut 41 by which the stud can be drawn out of an aperture 42 in the bag portion wall. The bail is locked in pulling position when in the uppermost aperture 42 or in extending position when in the middle aperture 42 or in carrying position when in the lowermost aperture 42. It was found, however, that the two positions of the bail is the most satisfactory. After the bag is removed from the trunk of the car, the movement of the bail from carrying to pulling position is all that is required to have the carrier ready to be pulled. In the same manner, it only requires the movement of the bail against the bag to have it ready in being lifted in the car trunk. As pointed out above, a cover could be employed for enclosing the club heads, the cover being retained on the end of the bag portion by tying a pull string beneath the collar 13.

In FIG. 8, a different form of the invention is illustrated, that wherein the bag portion has the boss 14 on the inner front wall and a foot 43 of plastic material molded with the bag portion and extending downwardly at the rear end. This provides a tripod support with the wheels 19 for retaining the bag portion in vertical position. The length of the foot can be reduced when the rod 17 is supported above by the bottom of the bag portion. A bail 44 is made from a heavy wire or light rod 45 having a handle 46 substantially the width of the bag portion disposed in the center thereof. The rod is bent to have two parallel side portions 47 which are bent at right angles to provide aligned ends 48. The rod is bent after the handle has been placed in the center thereof. The inwardly extending ends pass through a washer 49 and aligned apertures 51 in the sides of the bag and are forced into the ends of a tube 52 which engage the inner surface of the side walls to form a divider within the bag portion. Stop portions 35 may be provided below the collar 13 against which the side portions 47 of the bail 44 engage. The bail may be moved from pulling position to carrier position when pivoted downwardly against the bag portion.

As has been pointed out above, it is contemplated that a kit may be formed of the elements and compactly assembled within a carton for shipment. This eliminates the assembly of any of the parts on the bag portion by the manufacturer and further reduces the cost thereof.

I claim:

1. In a golf club carrier, a unit bag having forward, rearward and side portions of substantially uniform cross section from an open top to a closed bottom, said bag being rigid and made of plastic material in which golf clubs are to be carried, support means adjacent to the bottom of the forward portion of the bag within the cross sectional area thereof, a rod supported by said support means, wheels on the ends of said rod, a bail of U-shape having a web and extending legs, and a divider in said bag near the top thereof to which the ends of the extending legs are secured.

2. In a golf club carrier as recited in claim 1, wherein said divider is a tube which receives the ends of the extending legs when bent inwardly into aligned relationship with each other.

3. In a golf club carrier as recited in claim 1, wherein the legs are flattened on the ends and provided with an aperture, and wherein said divider is a rod which extends outwardly of the side portions of the bag and through the apertures in the flattened ends of the legs, and means for securing the flattened ends on the rod.

* * * * *